E. A. HAWK.
WAITER'S CHECK.
APPLICATION FILED DEC. 6, 1911.

1,075,648.

Patented Oct. 14, 1913.

| WAITER No 4 | CHECK No 2 |
|---|---|
| | |
| 4 | 2 |
| 4  40 cts. | 2 |
| 4  35 cts. | 2 |
| 4  30 cts. | 2 |
| 4  25 cts. | 2 |
| 4  20 cts. | 2 |
| 4  15 cts. | 2 |
| 4  10 cts. | 2 |
| 4  5 cts. | 2 |
| 4  This, and Each Coupon GOOD FOR 5 cts. When Presented at any Dep't. | |

Witnesses:
E. C. Shinkle
Geo. Knutson

Inventor:
E. A. Hawk
By his Attorneys:
Williamson Merchant

UNITED STATES PATENT OFFICE.

ELI A. HAWK, OF MINNEAPOLIS, MINNESOTA.

WAITER'S CHECK.

1,075,648.   Specification of Letters Patent.   Patented Oct. 14, 1913.

Application filed December 6, 1911. Serial No. 664,209.

*To all whom it may concern:*

Be it known that I, ELI A. HAWK, a citizen of the United States, residing at Minneapolis, in the county of Hennepin and State of Minnesota, have invented certain new and useful Improvements in Waiters' Checks; and I do hereby declare the following to be a full, clear, and exact description of the invention, such as will enable others skilled in the art to which it appertains to make and use the same.

My invention has for its object to provide an improved waiter's check for use, generally, in restaurants and lunch counters and various other places.

To the above ends, generally stated, the invention consists of the novel construction and arrangement of the parts of the check hereinafter described and defined in the claim.

Hitherto, it has been common in waiters' checks of the type employed in the so-called check systems, to make such checks into coupons, and to mark the coupons consecutively with numerals indicating a regular and definite increase in the value order of the coupons, and to sever the coupons and give to the customer the severed section on which the amount of his purchase is indicated by the coupon having the smallest number marked thereon. To illustrate, the coupons on these hitherto employed waiters' checks have been commonly marked consecutively as follows: 5 cts., 10 cts., 15 cts., 20 cts., etc. If the amount purchased is 20 cts., the one would be torn apart on a line between the 15 cts. and 20 cts., coupon, and that section of the ticket having 20 cts., marked thereon, as the lowest number, would be given to the customer or purchaser. With this arrangement of the ticket, 15 cts., would be the highest amount indicated on the other section of the ticket which is retained by the waiter, and this amount, as is evident, does not correspond to the 20 cts., value of the purchase indicating portion of the ticket.

My invention makes a very great improvement in the form of the waiter's check, by the addition to the lowest number end, or purchase of the ticket, of a so-called auxiliary coupon, the purchasing value of which, equals to the consecutive order of increase in the value of the coupons of the check. For instance, with the check having the 5 cts., increase in order, this auxiliary coupon will have a 5 cent purchasing value to the waiter. Hence, with this improved arrangement, no matter where the check is torn or severed between the coupons, both sections of the ticket will have the same value, to-wit, the value of one which is given to the purchaser, or customer will be represented by the lowest numbered coupon thereon and the value of the other, to-wit, the waiter's section of the ticket, will be indicated by the highest numbered coupon plus the value of the auxiliary coupon. With this improved arrangement, it therefore becomes practicable to use the check in a system wherein the waiter is required to tear off from the check enough coupons of the lower orders to include the auxiliary coupon, to purchase at the counter or at the kitchen, whatever articles are served to the customer. This feature has the very important advantage that it is absolutely impossible for the waiter to obtain any dishes or articles without first paying for the same by removing from the check, coupons representing the value thereof, and thereby leaving on the customer's check the indication of the same value of purchase.

One form of the improved check is illustrated in the single view of the drawings.

Referring to the drawings wherein the consecutively numbered coupons are indicated by the character $a$, and the so-called auxiliary coupon is indicated by the character $b$. In the ticket illustrated, a stub coupon $c$ is located at the upper end of the ticket and which is to be retained by the waiter and turned in at the proper times. The check is preferably divided into coupons in the usual way by perforated or weakened lines $f$. As an additional feature of novelty, all of the coupons, $a$, $b$ and $c$ are marked on one side with numerals indicating the number of the particular check, and on the other side with numerals indicating the number of the waiter using the check. This enables all of the coupons at any time to be properly identified with the original check from which they were removed. Preferably, the auxiliary coupon $b$ is marked as follows: "This and each coupon good for 5 cts. when presented at any department".

Carrying out the illustration of purchase above given, we will assume that the first purchase make by the customer amounts to 20 cts., and that before finishing the meal, he orders something amounting to an additional 5 cents. In this case, the waiter tears from the coupon section of the check, the coupon marked 20 cts. and with this coupon, in addition to the auxiliary coupon having the purchasing value of 5 cents to the waiter, he obtains the article, and by so severing the said coupon, increases the lowest amount on the customer's ticket to 25 cts., which, as is obvious, is the right amount of the total purchase.

What I claim is:

A waiter's check made up of coupons numbered in an increasing order of succession and comprising an auxiliary coupon, additional to the main series of coupons, having a given purchasing value equal to the order of increase in the value of said coupons, whereby, when the check is severed between coupons, the value indicated on the lowest coupon will equal the value of the highest coupon on the other section plus the value of the auxiliary coupon, the said auxiliary coupon being located at one end of the check adjacent to the coupon of lowest value, and the said coupons having identical identifying means.

In testimony whereof I affix my signature in presence of two witnesses.

ELI A. HAWK.

Witnesses:
F. D. MERCHANT,
HARRY D. KILGORE.